Figure 1:
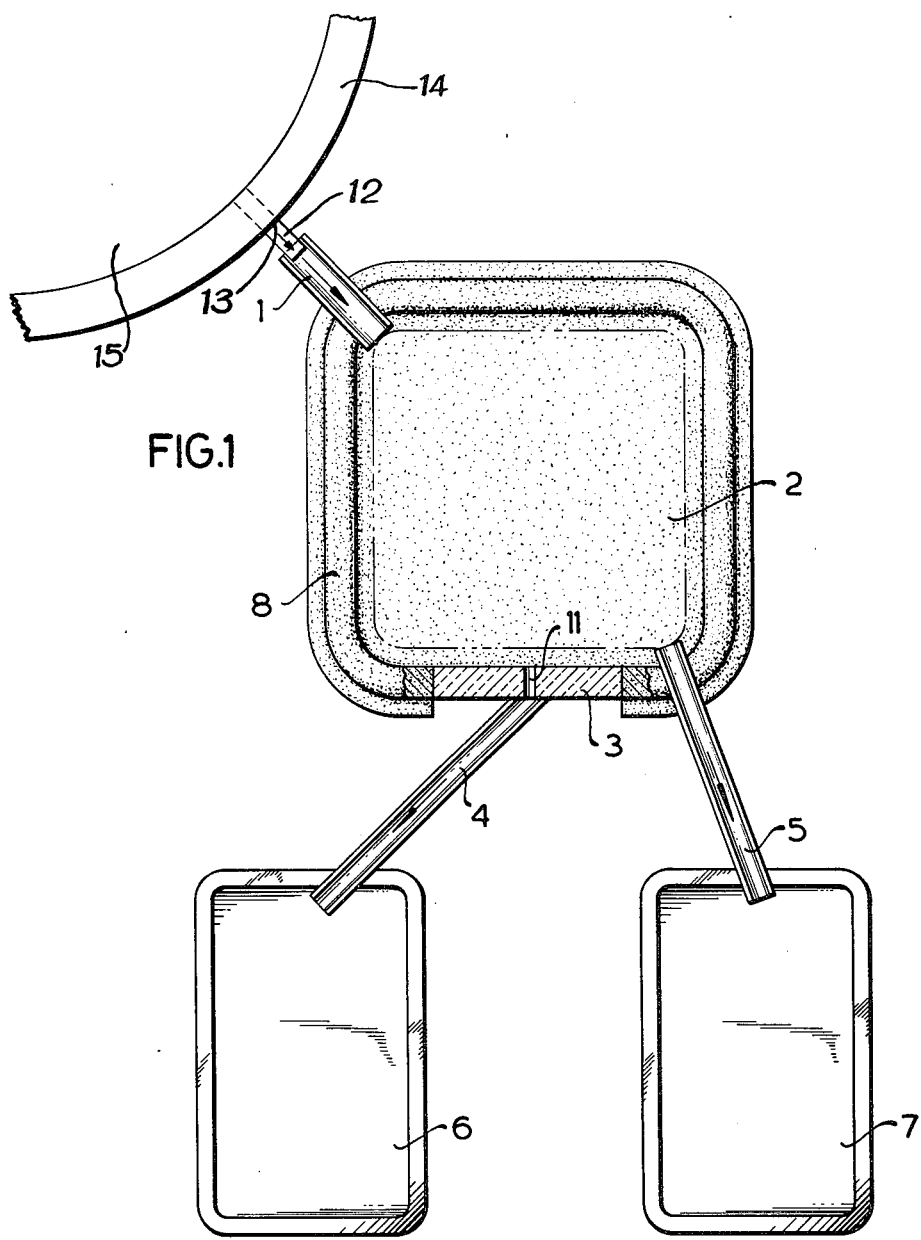

United States Patent [19]

Thümmler et al.

[11] 3,912,245

[45] Oct. 14, 1975

[54] APPARATUS FOR SEPARATING PHOSPHORUS FURNACE SLAG AND FERROPHOSPHORUS FROM ONE ANOTHER

[75] Inventors: Ursus Thümmler; Josef Rothkamp, both of Erftstadt-Liblar, Germany

[73] Assignee: Hoechst Aktiengesellschaft, Frankfurt am Main, Germany

[22] Filed: Nov. 7, 1973

[21] Appl. No.: 413,518

Related U.S. Application Data

[62] Division of Ser. No. 258,261, May 31, 1972, Pat. No. 3,802,561.

[30] Foreign Application Priority Data

June 2, 1971 Germany.............................. 2127251

[52] U.S. Cl. .................................................. 266/37
[51] Int. Cl.². ........................................... C21B 7/14
[58] Field of Search ............ 75/24, 29, 30, 89, 132; 266/34 R, 37, 38

[56] References Cited
UNITED STATES PATENTS
1,814,808   7/1931   Hughes et al. ........................... 75/24
3,720,506   3/1973   Muller et al. ........................... 75/24

*Primary Examiner*—Gerald A. Dost
*Attorney, Agent, or Firm*—Connolly and Hutz

[57] ABSTRACT

Phosphorus furnace slag and ferrophosphorus are separated from one another. To this end, a mixture of phosphorus furnace slag and ferrophosphorus, which is tapped off periodically from a phosphorus furnace, is introduced into a separating zone fitted with a bottom outlet and an overflow, through which the phosphorus furnace slag floating on the ferrophosphorus is delivered to a solidification zone. The separating zone has the dimensions necessary to receive the quantity of ferrophosphorus tapped off, which is allowed to remain therein for a period between 0.25 and 2 hours, so as to complete the separation of the phosphorus furnace slag by allowing it to solidify above the liquid ferrophosphorus. Liquid ferrophosphorus is finally discharged through the bottom outlet in the separating zone and delivered to a solidification zone.

1 Claim, 2 Drawing Figures

U.S. Patent  Oct. 14, 1975  3,912,245

APPARATUS FOR SEPARATING PHOSPHORUS FURNACE SLAG AND FERROPHOSPHORUS FROM ONE ANOTHER

CROSS REFERENCE TO RELATED APPLICATIONS.

This application is a division of copending prior U.S. Pat. application Ser. No. 258,261, filed May 31, 1972, now issued as U.S. Pat. No. 3,802,561. The present invention relates to an apparatus for separating phosphorus furnace slag and ferrophosphorus from one another.

U.S. Pat. No. 3,720,506 describes a process for separating ferrophosphorus and phosphorus furnace slag from one another, wherein a mixture of ferrophosphorus and phosphorus furnace slag, tapped off periodically from a phosphorus furnace, is delivered to a casting bed, the heavier ferrophosphorus being deposited on the bottom of said bed separately from the phosphorus furnace slag which floats thereon. The mixture is allowed to cool and the phosphorus furnace slag is cracked, crushed and removed from the ferrophosphorus by means of suitable machinery. Following this, suitable machinery is used to crush and remove the ferrophosphorus from below the deposit thereof. A preferred feature of this earlier process comprises accelerating the cooling operation by spraying water on to the melt and on to the ferrophosphorus freed from the slag which initially floated thereon.

Two substances of poor thermal conductivity are jointly cooled in this earlier process, which is not satisfactory. To effect the cooling step within acceptable periods of time, it is necessary for the mixture of ferrophosphorus and phosphorus furnace slag to be sprayed with water, of which unevaporated fractions may come into contact with the lowermost liquid layer of ferrophosphorus, this being rendered possible by Leidenfrost's phenomenon. The reaction of molten ferrophosphorus with water is known to entail the evolution of oxyhydrogen gas, which in turn may initiate more or less dangerous explosions with all their consequences.

A further disadvantage resides in the fact that the thick layers of phosphorus furnace slag and ferrophosphorus, which often adhere tenaciously together, are not easy to separate from one another. Considerable expenditure of time and energy is normally necessary to achieve this.

It is an object of the present invention to provide an apparatus, which enables ferrophosphorus and phosphorus furnace slag to be separated from one another by causing the ferrophosphorus and phosphorus furnace slag to solidify within acceptable periods of time, and this without the need to spray water thereonto nor with the need mechanically to separate the two layers of phosphorus furnace slag and ferrophosphorus, which tenaciously adhere together, from one another.

The process accomplished in the apparatus of the present invention comprises more particularly introducing a mixture of phosphorus furnace slag and ferrophosphorus, tapped off periodically from a phosphorus furnace, into a separating zone which is fitted with a closable bottom outlet and with an overflow, and has the dimensions necessary to receive the quantity of ferrophosphorus tapped off; delivering a major proportion of the phosphorus furnace slag, floating on the ferrophosphorus, through said overflow to a solidification zone downstream of the separating zone; allowing the ferrophosphorus to remain in said separating zone for a period between 0.25 and 2 hours, preferably 0.5 hour, so as to complete the separation of residual phosphorus furnace slag from the liquid ferrophosphorus with the resultant formation of a solid layer of phosphorus furnace slag above the ferrophosphorus; removing the liquid ferrophosphorus through the said bottom outlet in the said separating zone and delivering it to a separate ferrophosphorus solidification zone.

The step of allowing the ferrophosphorus and phosphorus furnace slag to solidify in separate zones has very beneficial effects. This is particularly true concerning the ferrophosphorus. In the absence of an insulating layer of phosphorus furnace slag above the ferrophosphorus, the heat is freely abstracted and the ferrophosphorus is cooled within acceptable limits without the need to use additional steps.

Molten ferrophosphorus and phosphorus furnace slag are known to form two layers in a phosphorus furnace. Turbulence is, however, produced upon the removal of the ferrophosphorus through a relatively small tapping hole in the furnace. As a result of this, phosphorus furnace slag and ferrophosphorus are discharged jointly. Owing to the considerable differences between the density of the two layers of molten material (flow rate of phosphorus furnace slag: $\rho = 2.7$ g/ml; liquid ferrophosphorus: $\rho \approx 7$ g/ml, the phosphorus furnace slag is found relatively rapidly to deposit and float on the ferrophosphorus. This, however, enables the phosphorus furnace slag to be separated from the ferrophosphorus in the separating zone by means of an overflow.

Minor amounts of ferrophosphorus, which may be introduced into the solidification zone receiving the phosphorus furnace slag, or minor amounts of phosphorus furnace slag, which may be introduced into the solidification zone receiving the ferrophosphorus, may be ignored.

The presence of phosphorus furnace slag in the ferrophosphorus which is discharged through the bottom outlet of the separating zone, is easy to discover by a distinct color change in the last portions of the effluent melt.

The apparatus comprises more particularly a separating bed for effecting separation therein of ferrophosphorus and phosphorus furnace slag from one another, the bed being fitted at one of its sides with a bunghole closable by means of a refractory plate and being connected to a phosphorus furnace by means of a pouring spout; a solidification bed receiving the phosphorus furnace slag and connected to the separating bed by means of an overflow, and a further solidification bed receiving the ferrophosphorus and connected to the separating bed by means of an outlet spout extending from directly downstream of the bunghole in the separating bed and terminating in said further solidification bed.

Further preferred features of the apparatus of the present invention, which can be used singly or in combination, provide:

a. for the use of a sand bed as the separating bed and
b. for the use of beds prepared from granulated phosphorus furnace slag as the solidification beds receiving the phosphorus furnace slag and the ferrophosphorus, respectively.

Figure 2:
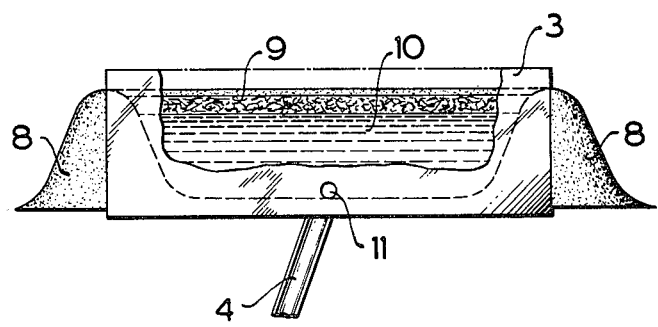

The apparatus of the present invention will now be described with reference to the accompanying drawing, in which FIG. 1 is a top plan view of the apparatus and FIG. 2 is a side elevational view of the separating bed in the direction of the refractory plate.

As can be seen, a furnace vessel 15 is provided with a tapping hole 13 which is disposed in the wall 14 of furnace vessel 15 so as to open into a conduit 12, which in turn opens into a pouring spout 1 terminating in a separating bed 2. The mixture of phosphorus furnace slag and ferrophosphorus present in the furnace vessel 15 is removed therefrom through said tapping hole 13 and delivered through said conduit 12 and the pouring spout 1 to said separating bed 2, which has the dimensions necessary to collect therein the quantity of ferrophosphorus tapped off and to prevent ferrophosphorus from flowing through overflow 5 into solidification bed 7 receiving the phosphorus furnace slag. The slag, i.e. a major proportion thereof, which initially floats on the ferrophosphorus, is delivered through overflow 5 to bed 7 and allowed to solidify therein. The ferrophosphorus in the separating bed is allowed to remain therein for a certain period of time. Following this, bunghole 11 (cf. FIG. 2) in the refractory plate 3 of separating bed 2 is opened and liquid phosphorus is delivered through spout 4 to bed 6 and allowed to solidify therein.

Following the complete separation of the ferrophosphorus and phosphorus furnace slag from one another, two separate layers of material are found to build up behind the refractory plate 3 which together with sand weirs 8 forms separating bed 2. This is shown by the broken lines in FIG. 2. The two layers comprise a lower layer 10 of liquid ferrophosphorus and upper layer 9 of solidified phosphorus furnace slag. Layer 9 bridging separating bed 2 is normally retained therein upon the removal of the liquid ferrophosphorus through bunghole 11.

EXAMPLE:

Suitable material (molding sand, clay, soderberg electrode mass) was used to close bunghole 11 in refractory plate 3 of separating bed 2. Following this, a mixture (14 tons) of molten ferrophosphorus and phosphorus furnace slag, which had a temperature between 1400° and 1450°C, was delivered through pouring spout 1 to separating bed 2. 6 Tons of specifically lighter phosphorus furnace slag were found to run through overflow 5 into solidification bed 7, and were allowed to solidify therein. The balance melt (8 tons), which consisted substantially of ferrophosphorus, was retained in separating bed 2 and allowed to remain therein for 30 minutes to enable the complete deposition of residual phosphorus furnace slag on the liquid ferrophosphorus. During that time, a substantial portion of the slag was found to solidify while forming a layer about 10–15 cm thick above the surface of the melt. Bunghole 11 was opened and liquid ferrophosphorus with a temperature of about 1300°C was discharged through spout 4 into solidification bed 6. Towards the end of the discharge, the last portions of the melt suddenly underwent a change in coloration which indicated that the melt was contaminated with phosphorus furnace slag. This was slag, which had remained liquid between the layer of solidified slag and the layer of liquid ferrophosphorus. As soon as this was noticed, bunghole 11 was closed by means of sand. The ferrophosphorus and phosphorus furnace slag were allowed to cool in their beds for 3 hours. Bed 6 contained 7.3 tons of ferrophosphorus and bed 7 contained 6 tons of phosphorus furnace slag. A further 0.7 on of phosphorus furnace slag was found to have been retained in separating bed 2. The solidified materials were easy to crush and remove from their beds by means of a digger.

We claim:

1. In an apparatus for separating a mixture of phosphorus furnace slag and ferrophosphorus into its components, wherein a phosphorus furnace vessel and a separating bed communicate with one another through a tapping hole disposed in the wall of the phosphorus furnace vessel so as to open into a conduit which in turn opens into a pouring spout terminating in the separating bed, and wherein a solidification bed receiving the phosphorus furnace slag is connected to the separating bed by means of an overflow, and wherein a solidification bed receiving the ferrophosphorus is connected to the separating bed by means of an outlet spout, and wherein said separating bed is fitted at one of its sides with a refractory plate having a closable bunghole in its lower part, and said outlet spout is extending from directly downstream of the said bunghole, the improvement according to which said solidification beds receiving the phosphorus furnace slag and the ferrophosphorus, respectively, are beds prepared from granulated phosphorus furnace slag.

* * * * *